SATURABLE CURRENT TRANSFORMER-TRANSISTOR CIRCUIT

Filed June 11, 1958 3 Sheets-Sheet 1

Inventor
Raymond E. Morgan
by Charles W. Helzer
His Attorney

Inventor
Raymond E. Morgan
by Charles W. Helzer
His Attorney

SATURABLE CURRENT TRANSFORMER-TRANSISTOR CIRCUIT

Filed June 11, 1958 3 Sheets-Sheet 3

Inventor
Raymond E. Morgan
by Charles W. Helzer
His Attorney

United States Patent Office 3,102,206

Patented Aug. 27, 1963

3,102,206
SATURABLE CURRENT TRANSFORMER-TRANSISTOR CIRCUIT

Raymond E. Morgan, Schenectady, N.Y., assignor to General Electric Company, a corporation of New York Filed June 11, 1958, Ser. No. 741,365
10 Claims. (Cl. 307—88)

The present invention relates to a control amplifier.

More particularly, the invention relates to a compact and relatively inexpensive control amplifier that provides a proportional control output signal, and that is both fast responding and reliable in operation.

Control amplifiers are used to control the operations of many different electrical equipments such as outdoor lighting systems, electric signs, electric furnaces, battery charging equipment, D.-C. motor and other similar devices. In many of these applications, it is desirable that the equipment be both reliable and efficient, and as light weight and compact as possible. These are particular requirements of equipment designed for military use. To satisfy these requirements, it is necessary that the control amplifiers used with the equipment be designed to incorporate similar characteristics. It is also desirable that the control amplifier be capable of proportionally controlling the devices with which it is used in accordance with an input control signal.

It is therefore a primary object of the invention to provide a new and improved control amplifier that is light weight, compact and relatively inexpensive to manufacture, and that is both fast responding, reliable in operation, and capable of proportional control.

In practicing the inventions, a proportional control amplifier is provided which comprises a transistor having an input circuit and an output circuit and a saturable core transformer having a high impedance winding, and a low impedance winding inductively coupled to the high impedance winding. The high impedance winding of the transformer is connected in the input circuit of the transistor, and the low impedance winding is connected in the output circuit of the transistor. The control amplifier is completed by a control signal source that is connected through the high impedance winding of the saturable core transformer to the input circuit of the transistor. In a preferred embodiment of the invention, the control signal circuit comprises a separate bias winding inductively coupled to the high impedance winding of the saturable core transformer, and a variable resistor and rectifier connected in series circuit relationship across the high impedance winding. A third embodiment of the control amplifier constructed in accordance with the invention includes a variable resistor control and a fourth embodiment includes a saturable core reactor in place of the variable resistor with the reactor having a high impedance winding connected in series circuit relationship with a rectifier across the high impedance winding of the saturable core transformer. In this last mentioned embodiment of the invention, the saturable core reactor also has a low impedance winding which is connected to a source of weak control signals.

Other objects, features and many of the attendant advantages of this invention will be appreciated more readily as the same becomes better understood by reference to the following detailed description, when considered in connection with the accompanying drawings, wherein like parts in each of the several figures are identified by the same reference character, and wherein.

Figure 1:
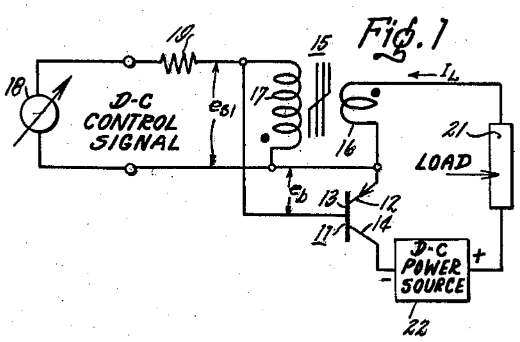
FIGURE 1 is a schematic circuit diagram showing the basic features of a control amplifier constructed in accordance with the invention.
Figure 4:
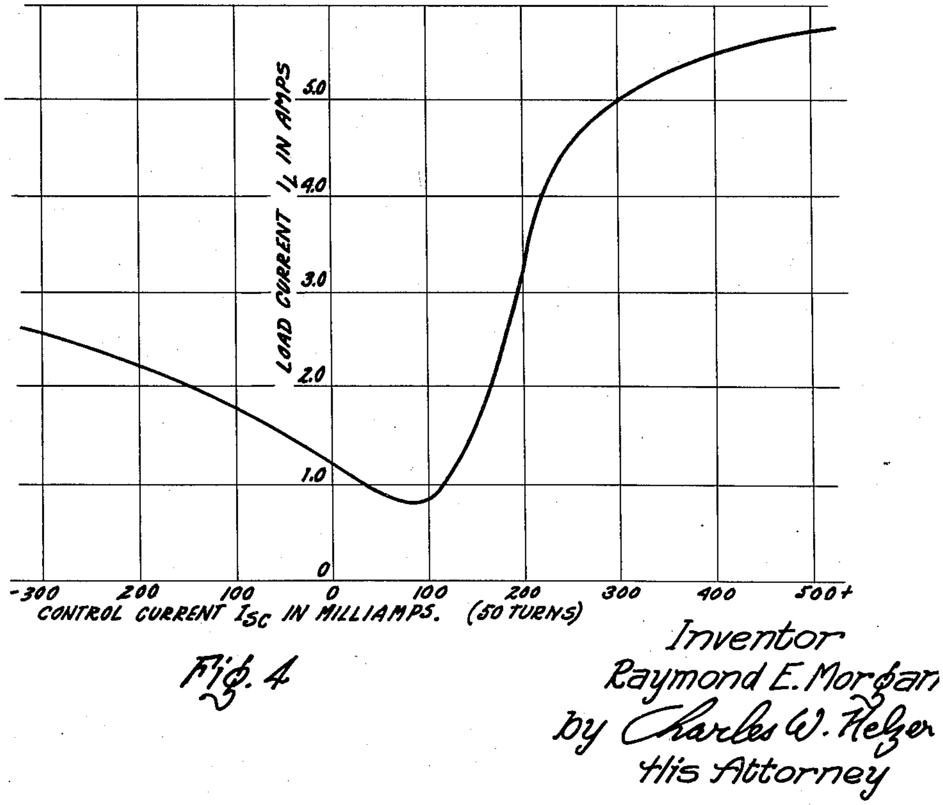
FIGURE 4 is a characteristic curve illustrating the control current versus load current characteristic of the control amplifier circuit shown in FIGURE 1.

The control amplifier circuit illustrated in FIGURE 1 of the drawings includes a switching semiconductor comprising a transistor 11 having an emitter electrode 12, a base electrode 13 and a collector electrode 14. Connected to transistor 11 is a saturable core transformer 15 having a high impedance winding 17 inductively coupled to a low impedance winding 16. The high impedance winding 17 is connected in the input circuit of the transistor by having one of its terminals connected to the emitter electrode 12 of transistor 11 and to one side of a source of weak continuous linearly varying direct current control signals 18. The remaining terminal of the high impedance winding 17 is connected through a filter resistor 19 to the remaining side of the control signal source 18 and to the base electrode 13 of transistor 11. The low impedance winding 16 is connected in the output circuit of the transistor by connecting the emitter electrode 12 through winding 16, and a load resistor 21 to the positive side of a direct current power supply 22 as shown. The circuit is completed by connecting the collector electrode 14 of the transistor to the negative terminal of the direct current power source 22. While it is not essential that the parameters of the new and improved control amplifier shown in FIGURE 1 have the following values, these values as cited are as exemplary or typical of a control amplifier designed to handle in the neighborhood of 200 to 400 watts of power. For such a circuit it is anticipated that transistor 11 could comprise a Delco 2N174 or 2N173 power transistor which has a collector voltage rating of 80 volts or 60 volts respectively and a collector load current rating of 12 amperes. These power transistors are described more fully in Engineering Data Sheets 2N173 or 2N174 issued by the Delco Radio Division of General Motors Corporation on September 26, 1956, under the above two reference numerals, and comprise essentially PNP alloy junction power transistors. If desired, other power transistors can be used, for example, such as the Delco DT100 or the Delco 2N277 power transistors or the General Electric transistor GE–2N188A, depending upon the power rating desired from the control amplifier. The saturable core of transformer 15 is preferably formed from a composition such as 4% molybdenum, 79% nickel, and 17% iron, and which is shaped in the form of a closed ring having an inside diameter of about one-half inch and an outside diameter of about .56 inch. The lower impedance windings 16 of the saturable core transformer is formed by approximately 10 turns of 0.040 inch diameter copper wire and the high impedance winding 17 is formed by approximately 50 turns of .016 inch diameter copper wire wound on a common core with the low impedance winding. The direct current power supply source 22 may comprise a 60 volt battery, and the load circuit 21 is preferably formed by a resistor having a value in the neighborhood of 6 ohms. As depicted in FIGURE 4 of the drawings, the input control current may vary from 0 to 500 milliamps, and the filter resistor 19 preferably has a value of approximately 100 ohms.

Figure 2:
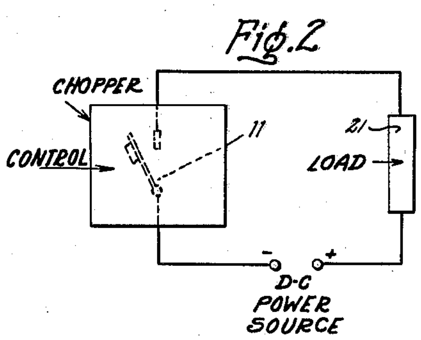
FIGURE 2 is a functional block diagram illustrating the manner in which the control amplifier shown in FIGURE 1 operates.
Figure 3:
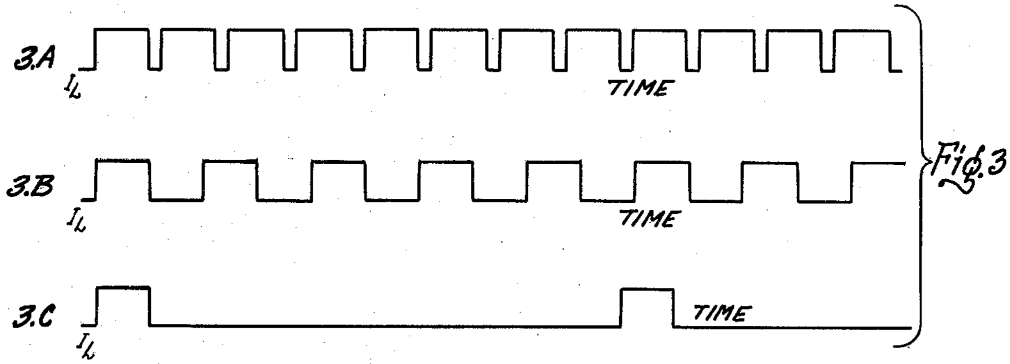
FIGURE 3 is a characteristic curve showing the time versus output load current characteristics of the basic control amplifier circuit shown in FIGURE 1.
Figure 6:
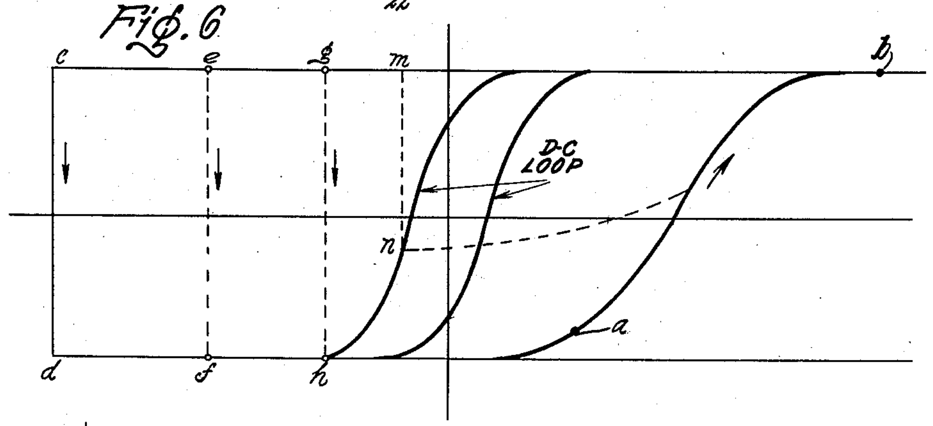
FIGURE 6 is a hysteresograph showing the magnetic flux excursions of a magnetic core employed in the control amplifier circuit illustrated in FIGURE 5, and illustrates the various flux saturation phases of the saturable core of the transformer.

With the control amplifier constructed in the above described manner, the circuit functions basically as a chopper switch in the manner illustrated by the functional block diagram shown in FIGURE 2 of the drawings. The transistor 11 functions as a switch in that it is alternately rendered operative and inoperative by the saturable core transformer to produce output load currents whose waveshapes are shown in FIGURES 3A, 3B, and 3C. As can be determined from the examination of FIGURE 3, the longer the length of time that the switch S1 or transistor 11 is left open or nonconducting, the smaller the load power becomes. This phenomena is depicted by the graph shown in FIGURE 3. The amplitude of the output current having the waveforms shown in FIGURE 3 will be determined by the value of the control current characteristic of the circuit illustrated in FIGURE 4 of the drawings. During this operation the saturable core transformer functions to control the time that transistor 11 is turned off in a manner best described in connection with the hysteresis curve shown in FIGURE 6. Although FIGURE 6 actually depicts the hysteresis curve of the circuit illustrated in FIGURE 5 of the drawings, it is so similar to the hysteresis curve for the circuit shown in FIGURE 1, that it may be referred to in connection with the description of the operation of the FIGURE 1 circuit. Assuming the transistor 11 to be in its cutoff condition the saturable core of the saturable core transformer 15 will be at negative saturation or approximately at point *d* of the hysterisis curve shown in FIGURE 6 of the drawings. The saturable core of transformer 15 is at negative saturation point *d* due to the effect of the D.-C. control current from source 18 flowing through high impedance winding 17. If at this point because of extraneous effects, such as positive bias from a transistor bias circuit (not shown), a small amount of load current is allowed to flow through the low impedance primary windings 16 of the transformer 15, this current will drive the transformer core flux density to point *a* of the hysteresis loop shown in FIGURE 6, resulting in current flow through the low impedance primary winding 16 that produces a voltage $e_{s1}$ across the high impedance winding 17. The voltage $e_{s1}$ is added to the bias voltage supplied to the transistor 11 in a regenerative manner so as to force the transistor 11 to snap "full on," and remain "full on" during the flux density excursion from *a* to *b* on the hysteresis loop shown in FIGURE 6. At the point *b* the core of the transformer 15 saturates so that the voltage $e_{s1}$ across the high impedance primary winding 17 drops to zero, and transistor 11 is turned almost off decreasing the load current $I_L$ flowing in low impedance primary winding 16. As the load current $I_L$ decreases the voltage $e_{s1}$ is driven negative due to the polarity of the control signal $I_{sc}$ and results in forcing the transistor 11 to cut off. Upon the transistor 11 being cut off, the control current $I_{sc}$ alone controls the saturation condition of the saturable core in transformer 15. At this point in the flux density excursion, the flux in the transformer core has dropped to point *c* of the hysteresis loop, and thereafter the negative polarity control current $I_{sc}$ drives the transformer core into negative saturation at point *d*. Upon reaching the negative saturation point *d* the secondary voltage $e_{s1}$ again becomes zero until transistor 11 bias circuit partially turns the transistor on sufficiently for the regenerative action to commence again and repeat the cycle of operation just described. The distributed capacitance in the transformer windings helps the circuit to snap on and off in the manner described so as to induce or continue oscillation of the circuit. The time the transistor 11 is turned on is determined by the value of the voltage $e_{s1}$ of winding 17 and remains constant provided the flux in the saturable core transformer maintains a full excursion from negative to positive saturation, and minor B-H loops are avoided. During the time that the transistor is turned on, that is, time required for the flux density to reach point *b* from point *a* on the hysteresis loop shown in FIGURE 6, the saturable core transformer operates as a regular current transformer. Under these conditions the power consumed by the circuit to develop the secondary voltage $e_{s1}$ is determined by the secondary circuit parameters. The time that the transistor is turned on can be determined from the equation:

$$T_{ON}=N_{s1}\frac{\Delta\phi}{e_{s1}}$$

where $N_{s1}$ is the number of turns on the high impedance winding 17 of the saturable core transformer 15, and $\Delta\phi$ is the flux excursion of the transformer core. The terms $N_{s1}$ and the flux excursion $\Delta\phi$ are design parameters of the saturable core transformer, and the secondary voltage $e_{s1}$ is a function of the design parameters of primary and secondary circuit components including the high impedance winding 17, low impedance winding 16, the power source 22 voltage, and the load circuit 21. For a given supply voltage, load resistance, and other design parameters, the time the transistor is turned on remains constant, and the average load current is controlled by the control current $I_{sc}$ controlling the time required to drive the saturable core of the transformer from positive to negative saturation in accordance with its magnitude. The resulting load current is exemplified by the graph shown in FIGURE 3 of the drawings. FIGURE 3A illustrates the load current developed for control current $I_{sc}=+300$ milliamperes. With the control current $I_{sc}$ at this value, the flux density of the core is caused to trace the entire B-H hysteresis loop *abcda* of FIGURE 6. The reduction of the control current $I_{sc}$ to a value of 200 milliamperes changes the B-H hysteresis loop traced by the flux in the core to *abefa* on the hysteresis graph shown in FIGURE 6, and the resulting output load current $I_L$ waveshape is shown in FIGURE 3B. Upon reducing the control current to a value $I_{sc}=100$ milliamperes the B-H loop traced by the core flux is *abgha* and the waveshape of the resulting load current $L_L$ is shown in FIGURE 3C. The explanation for this change in operation centers about the well-known characteristic of high frequency B-H hysteresis loops, the wider the loop (that is, the greater the amplitude of the driving magnetomotive force H) the faster the flux density B of the core traverses from positive to a negative saturation. Hence, the time for the flux density excursion from point *c* to point *d* in FIGURE 6 is less than the time for the flux density excursion from the point *e* to the point *f*, and this in turn is less than the time for the flux density excursion from the point *g* to point *h*. Accordingly, during the excursion of the flux density from positive to negative saturation (that is, from point *c* to point *d*, or from point *b* to point *f*, or from point *g* to point $h$), the control current $I_{sc}$ is the main contributor to the magnetomotive force H of the core. Under these conditions the secondary voltage $e_{s1}$ is negative at the dot shown in FIGURE 1 so that the bias voltage $e_b$ applied to the transistor is likewise negative, thereby driving the transistor below cutoff. It follows, of course, that the longer it takes for the core to be driven from positive to negative saturation by the bias current, the smaller load current $I_L$ becomes. This time is determined by the magnitude of the bias current $I_{sc}$, and determines the time that the transistor will be cut off. Hence smaller values of control current $I_{sc}$ result in an output load current such as is indicated in FIGURE 3B or FIGURE 3C depending upon the magnitude of the control current $I_{sc}$. Decreasing the control current $I_{sc}$ to a value below 100 milliamperes, or some other minimum value determined by the parameters of the circuit involved, may tend to increase the frequency of the circuit, and hence gradually increase the load current. This occurs because of the tendency of the saturable core to traverse a minor B-H loop such as is illustrated at *mnbm* in FIGURE 6. It is believed apparent that the flux density excursion from $m$ to $n$ being less than the excursion from $b$ to $h$ will require less time, and hence, the time the transistor is turned on and the time it is turned off is less for the B-H loop *mnbm* than for the B-H loop *habgh*. As a consequence the frequency of operation or oscillation of the circuit is increased. It, of course, follows that as the current $I_{sc}$ is decreased below 100 milliamperes or some other corresponding minimum value determined by the parameters of the circuit, the time off decreases more rapidly than the time on thereby causing an increase in the average load current $I_L$. There is danger in operating the circuit in this manner, however, in that overheating might occur and operation of the circuit in the region where full excursion of the flux density through a major B-H hysteresis loop is recommended.

From the above description, it can be appreciated that the average output load current $I_L$ of the control amplifier is controlled by the input control current $I_{sc}$ by varying the time that the transistor 11 of the control amplifier is "turned off." By varying the input control current $I_{sc}$ in discrete stepwise increases or decreases in value, it is possible to proportionally control the average output load current $I_L$ of the control amplifier. Further, because of the novel arrangement of the control amplifier whereby the load circuit, D.-C. power source and low impedance primary winding of the saturable core transformer are all included in the emitter-collector output circuit of the transistor power, dissipation in operating the control amplifier is at a minimum. This makes it possible to construct a power amplifier having a given output power rating in as compact and light weight fashion as is possible, and by designing the control amplifier to operate in the frequency range from one (1) to ten (10) kilocycles, the response of the control amplifier to increases or decreases in the control signal input $I_{sc}$ can be made to be practically instantaneous so that the amplifier is fast responding.

Figure 5:
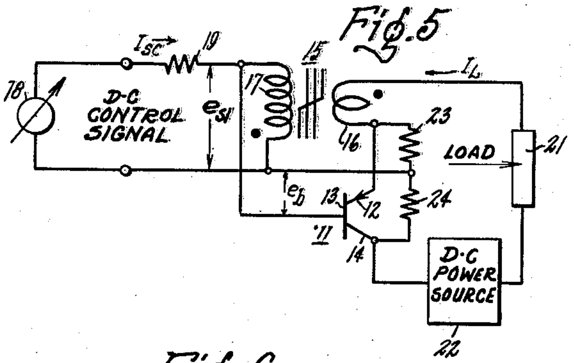
FIGURE 5 is a schematic diagram of a second embodiment of a control amplifier constructed in accordance with the invention.
Figure 7:
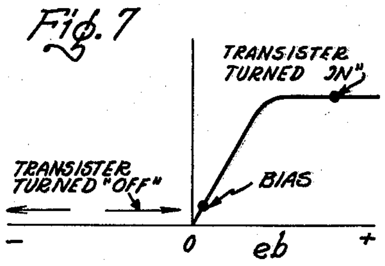
FIGURE 7 is a collector current versus base-emitter voltage characteristic curve of the transistor shown in FIGURE 5.

A second embodiment of the invention is shown in FIGURE 5 of the drawings wherein the control amplifier is identical to that described in relation to FIGURE 1 of the drawings with the exception that a pair of bias resistors 23 and 24 are connected in series circuit relationship between the emitter electrode 12 and the collector electrode 14 of transistor 11. The junction point of the resistors 23 and 24 is connected to one terminal of the high impedance winding 17 of saturable core transformer 15 with the remaining terminal of the high impedance winding 17 being connected to the base electrode 13 of transistor 11. With the control amplifier thus constructed, the bias resistors 23 and 24 develop a bias voltage $e_b$ which is applied between the base and emitter electrodes 13 and 12 of transistor, and if of sufficient value to bias the transistor well into the conductive region of its collector current versus base-emitter voltage characteristic curve as shown in FIGURE 7 of the drawings. The application of the transistor bias voltage $e_b$ by the bias resistors 23 and 24 permits the control amplifier circuit of FIGURE 5 to maintain oscillation under wider variations in the power source voltage 22, and ambient temperature and other transient conditions than the circuit shown in FIGURE 1 of the drawings. In all other respects, the operation of the FIGURE 5 control amplifier is identical to that described with relation to the circuit shown in FIGURE 1 of the drawings, for as stated previously, the B-H hysteresis loop shown in FIGURE 6 of the drawings, and with respect to which the operation of the FIGURE 1 circuit was described, is in fact the B-H hysteresis loop of the circuit shown in FIGURE 5.

Figure 8:
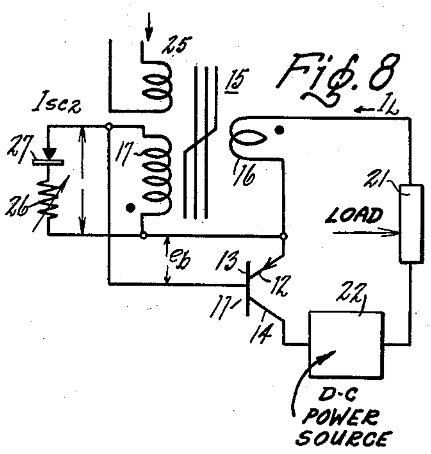
FIGURE 8 is a schematic circuit diagram of still a third embodiment of a power control amplifier constructed in accordance with the invention.

Still a third form of the new and improved control amplified circuit constructed in accordance with the present invention is disclosed in FIGURE 8 of the drawings.

In the FIGURE 8 embodiment of the control amplifier, all of the elements of the circuits described with relation to FIGURES 1 and 5 of the drawings are present with the exception that the source of D.-C. control signals 18 has been replaced with an additional bias winding 25 which is inductively coupled to the high impedance winding 17, and has a source of D.-C. biasing signals connected thereto, not shown. In addition to the biasing winding 25, a control circuit network is connected in series circuit relationship across the high impedance winding 17 and comprises a variable resistor 26 which may be a thermistor or rheostat, and a rectifier 27. The polarity of the rectifier 27 is such that it passes current through the closed circuit including variable resistor 26 and high impedance winding 17 only during the negative excursions of the flux in the saturable core of saturable core transformer 15, and serves to cut off current flow through the circuit during the positive excursions of the flux in saturable core of transformer 15 during the time that the transistor 11 is not conducting. If desired, bias resistors such as 23 and 24 of the circuit shown in FIGURE 5 may be connected across the emitter-collector circuit of transistor 11, but for simplicity sake, such bias resistors have not been illustrated in FIGURE 8.

While the construction of the new improved control amplifier shown in FIGURE 8 is not to be limited in any manner by the following parameters, these values are cited as exemplary or typical of a control amplifier designed to control some 300 watts of power. For an amplifier of this rating, the variable resistor 26 ranges from zero to 1000 ohms and the rectifier 27 is preferably a silicon rectifier of any of the commercially available types having a sufficiently high reverse current and voltage rating to prevent conduction during the positive excursion of the flux in saturable core transformer 15 while transistor 11 is conducting. The bias winding which may be formed of some 300 turns of .010 inch diameter copper wire wound on the same core as the high and low impedance windings 17 and 16, respectively, and has a bias current of about 60 milliamps direct current supplied thereto. While this value is cited as exemplary, the circuit is adjusted so that an output current $I_L$ equal to about 5 amperes is obtained with the variable resistor 26 set at its maximum value. With the variable resistor 26 set at its maximum value, the waveshape of the output load current resembles that shown in FIGURE 3A of the drawing. As resistor 26 is decreased in value, the current $I_{sc}$ flowing in secondary circuit comprising resistor 26, rectifier 27, and the high impedance winding 17 increases. The current $I_{sc}$ of course only flows during the period when voltage $e_{s1}$ is negative at the end of high impedance winding 17 where the dot is located, and the flux density in the saturable core is dropping between the points $c$ and $d$ of the B-H hysteresis loop shown in FIGURE 6 of the drawings. The current $I_{sc}$ flowing in high impedance winding 17 provides ampere turns in that winding which oppose the ampere turns provided by the bias winding 25, and accordingly as the current $I_{sc}$ increases, the load current $I_L$ decreases in a manner similar to the circuit shown in FIGURES 1 and 5 of the drawings when the control current $I_{sc}$ was changed from 300 milliamperes to 100 milliamperes. Consequently, the load current $I_L$ decreases as the control resistor 26 decreases until the resistance of the control resistor 26 equals zero, in which event the forward resistance of the rectifier 27 limits the current $I_{sc}$ to some set value which will provide a minimum output load current. With the resistor 26 set to equal zero the waveshape of the output load current will resemble FIGURE 3C of the drawings.

Figure 9:
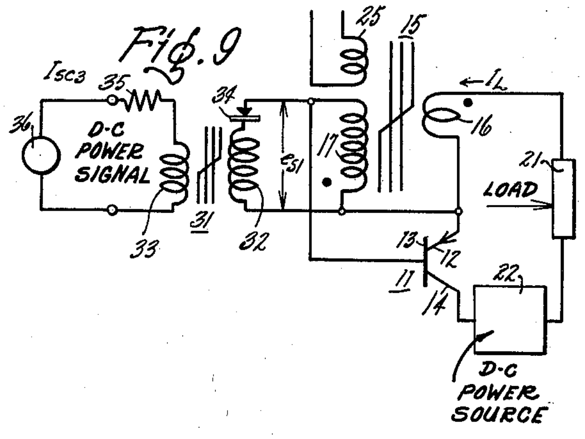
FIGURE 9 is a schematic circuit diagram of still a fourth embodiment of a control amplifier constructed in accordance with the invention.

Still a fourth embodiment of the new improved control amplifier circuit constructed in accordance with the invention is shown in FIGURE 9 of the drawings. The FIGURE 9 embodiment of the control amplifier circuit resembles very much the circuit shown in FIGURE 8 of the drawings with the exception that a small self saturating type magnetic amplifier indicated at 31 is incorporated in the circuit with its high impedance winding 32 connected in series circuit relationship with a rectifier 34 in place of the resistor 26 and rectifier 27 of the circuit shown in FIGURE 8. The high impedance winding 32 and rectifier 34 are connected in series circuit relationship across the high impedance winding 17 of the saturable core reactor 15 of the control amplifier circuit. The high impedance gate winding 32 of the magnetic amplifier or second saturable core reactor 31 is conductively coupled to a low impedance primary winding 33 of the reactor which in turn is connected in series circuit relationship with a smoothing resistor 35 and a source 36 of weak control signals. The source of control signals 36 may be a thermocouple or some other instrument sensing element having a low amplitude output signal which must be amplified before application to the saturable core transformer-transistor control amplifier circuit. If desired, a pair of bias resistors may be connected between the emitter-collector circuit of the transistor 11 in the manner shown in the FIGURE 5 circuit. Accordingly, the control amplifier of FIGURE 9 operates in the same manner as the control amplifier circuit shown and described with relation to FIGURE 1 of the drawings with the exception that the weak control signals of the source 36 operate in just a little different manner to proportionally control the output load current $I_L$ of the control amplifier. The rectifier 34 may again comprise a silicon, selenium or germanium rectifier having a sufficiently high reverse current voltage rating to prevent conduction during the positive excursions of the flux in the saturable core transformer 15. The second saturable core transformer or reactor 31 which function as a self-saturating type magnetic amplifier is preferably formed from a ring shaped core member of 4% molybdenum, 79% nickel, and 17% iron composition, and the high impedance gate winding 32 is formed from 500 turns of 0.005 inch diameter copper wire while the low impedance winding 33 is formed from 100 turns of the same size wire. The resistor 35 may have a value of 100 ohms while the source of weak control signals 36 provide control signals having a value anywhere from −0.1 milliampere to +0.1 milliampere.

Figure 10:
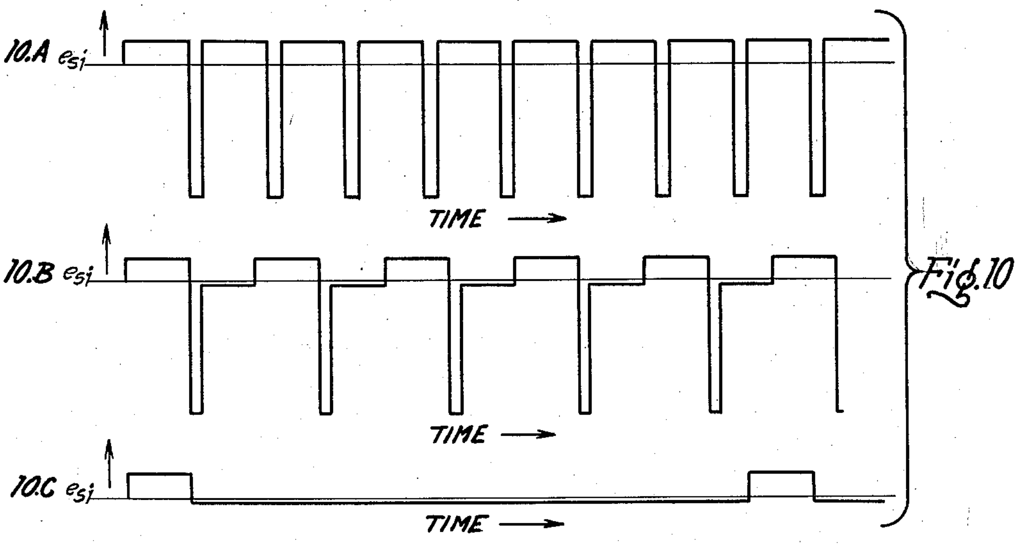
FIGURE 10 is a current-time characteristic plot of the circuit illustrated in FIGURE 9 of the drawing, and shows the waveform of the secondary voltage $e_s$ induced across the high impedance winding comprising a part of the circuit for three different operational settings.

By reason of the above arrangement, the saturable core reactor-transistor amplifier may be controlled by extremely weak control signals applied to the second saturable core reactor 31 which functions as a magnetic amplifier, and which receives its alternating current power from the earlier described saturable core transformer-transistor control amplifier which it controls. In a sense then, the control amplifier circuit of FIGURE 9 is the same circuit as that illustrated in FIGURE 8 of the drawings with the variable resistor 26 being replaced by the saturable reactor or magnetic amplifier. Accordingly, the saturable core reactor 31 combined with the rectifier 34 functions as a half way self saturating type magnetic amplifier which controls the control current $I_{sc3}$ that in turn controls the average load current $I_L$ of the saturable core transformer-transistor control amplifier in a manner similar to the manner in which the variable resistor 26 controls the load current $I_L$ of the control amplifier circuit shown in FIGURE 8. The saturable core reactor 31 or magnetic amplifier 31 operates from the alternating current voltage $e_{s1}$ similar to a conventional self saturating magnetic amplifier, however, in contrast to such a conventional self saturating magnetic amplifier, the magnetic amplifier 31 short circuits its supply voltage $e_{s1}$ when it saturates. Upon this occurrence, the secondary voltage $e_{s1}$ drops to a value about 5 percent of the voltage of $e_{s1}$ when the saturable reactor 31 is unsaturated. Typically, $e_{s1}$ equals 15 volts when the saturable reactor 31 is unsaturated and equals about 1 volt when saturable reactor 31 saturates. The waveshapes of the secondary voltage $e_{s1}$ are shown in FIGURE 10 of the drawings. When the saturable reactor 31 remains unsaturated for the entire cycle of operation of the control amplifier circuit, the output load current will equal 5 amperes and will have a waveshape comparable to that shown in FIGURE 3A of the drawings. To produce such an output load current, the voltage $e_{s1}$ will have a waveshape such as that shown in FIGURE 10A of the drawings. When the saturable reactor 31 remains saturated during the entire cycle of operation of the control amplifier circuit the output load current $I_L$ will have a waveshape similar to that illustrated in FIGURE 3C of the drawings and will equal about 0.8 ampere, and the voltage $e_{s1}$ will have a waveshape similar to that shown in FIGURE 10C of the drawings. When the saturable reactor 31 is unsaturated at the start of the negative half cycle, that is, when the voltage $e_{s1}$ is negative at the dot shown adjacent to high impedance winding 17 the voltage $e_{s1}$ will start at the same voltage shown in FIGURE 10A and later in the cycle, upon the saturable reactor 31 saturating, the voltage $e_{s1}$ drops to the voltage shown in FIGURE 10C, resulting in an output waveshape such as shown in FIGURE 10B of the drawings. The resulting output current $I_L$ will then have a waveshape similar to that shown in FIGURE 3B of the drawings. The time that the saturable reactor 31 saturates during the portion of the cycle, voltage $e_{s1}$ is determined by the value of the control current $I_{sc3}$. Hence, as the magnitude of the control current $I_{sc3}$ varies, the frequency of saturation of saturable reactor 31 will vary, and consequently the frequency of oscillation of the saturable core transformer-transistor control amplifier circuit will vary to thereby vary the value of the output load current $I_L$ in the manner previously described. Hence, it can be appreciated that the high impedance winding 32 of the saturable reactor or magnetic amplifier 31 functions in much the same manner as the variable resistor 26 of the circuit, shown in FIGURE 8, to control the average output load current $I_L$, with the exception that the saturable core reactor or magnetic amplifier 31 controls the phase of the current $I_{sc2}$, which in turn determines the rate of saturation of the main saturable core transformer 15 and, hence, the rate of oscillation of the saturable core transformer-transistor control amplifier circuit.

Figure 11:
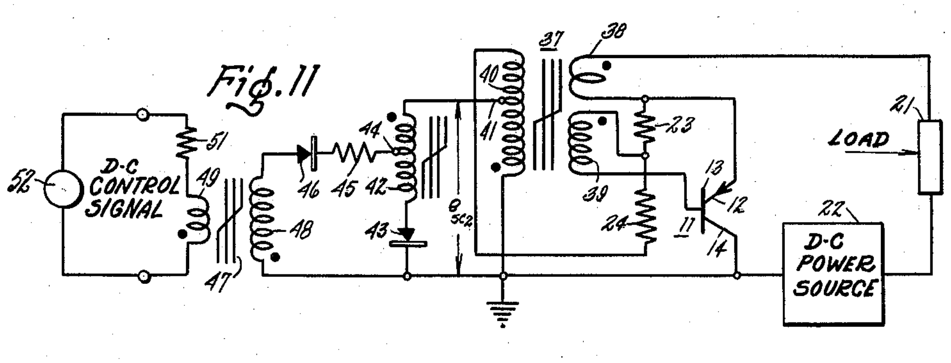
FIGURE 11 is a schematic circuit diagram of still a fifth form of a control amplifier constructed in accordnace with the invention.

Still a fifth form of a new improved control amplifier constructed in accordance with the invention is shown in FIGURE 11. The embodiment of the invention shown in FIGURE 11 is in many respects similar to that shown in FIGURES 8 and 9 with the exception that two additional magnetic amplifier stages have been added which derive their alternating current power from the saturable core transformer-transistor control amplifier circuit. In this form of the invention, saturable core transformer 37 is provided which has a low impedance winding 38 inductively coupled to a high impedance winding 39, and to a bias winding 40. The high impedance winding 39 of saturable core transformer 37 is connected between the base and emitter electrodes in the input circuit of the transistor 11 by having one of its terminals connected to the base electrode of the transistor, and the remaining terminal connected to the junction point of a pair of bias resistors 23 and 24. The bias resistors 23 and 24 are connected in series circuit relationship between the emitter electrode 12 and collector electrode 14 of the transistor, through the bias winding 40 of the transformer. The low impedance primary winding 38 of the saturable core reactor is connected in series circuit relationship with the load 21 and the direct current power source 22 in the emitter-collector circuit of the transistor 11. The bias winding 40 has a tap point 41 connected through a high impedance or gate winding 42 of a first saturable core reactor and through a rectifier 43 to the remaining free terminal of the bias winding 40, which preferably is grounded. The first saturable core reactor winding 42 in turn has a tap point 44 connected through a smoothing resistor 45 and rectifier 46 to the high impedance or gate winding 48 of a second saturable core reactor 47. The second saturable core reactor 47 has a low impedance control winding 49 inductively coupled to the high impedance or gate winding 48 thereof, and connected through a smoothing resistor 51 to a source of weak control signals indicated at 52. For the purpose of illustration, the elements of the control amplifier shown in FIGURE 11 may be constructed as follows. The cores of the saturable core transformer and all reactors may be formed from small rings of a composition comprising 4% molybdenum, 79% nickel, and 17% iron. The low impedance winding of the saturable core transformer 37 may be formed from 10 turns of 0.032 inch diameter copper wire, and a high impedance winding 39 is made from 50 turns of similar wire. The bias winding of the saturable core transformer 37 is formed from 200 turns of .010 inch diameter copper wire wound on the same core as the high impedance and low impedance winding, and has a tap point 41 taken at a point some 50 turns from the lower end of the transformer. The first saturable core reactor 42 may be formed from 500 turns of .005 inch diameter copper wire with the tap point 44 being taken at a point some 100 turns from the top or high voltage end of the winding. The second saturable core transformer 47 preferably has the high impedance gate winding 48 formed from 500 turns of 0.005 inch diameter wire, and the impedance winding 48 is formed from 100 turns of 0.005 inch diameter copper wire with both of the windings being wound around a common core. Smoothing resistor 51 preferably has a value of about 1000 ohms while the resistor 45 has a value of about 50 ohms. The rectifiers 43 and 46 again are preferably silicon rectifiers having the required reverse current and voltage ratings, and a sufficiently low forward resistance to allow about 0.8 volt drop when current flows through the closed circuits of which they comprise a part upon the saturable cores being saturated.

The FIGURE 11 embodiment of the invention functions in an identical manner to that of the circuit shown in FIGURE 9 with the exception however, that the tap 41 derives its power from bias winding 40 from the operation of the saturable core transformer-transistor control amplifier circuit, and supplies a portion of this power to both the first and second saturable core reactors. Hence, only a single power supply 22 is required for the control amplifier, yet it includes two stages of preamplification for the control signal. Briefly, the bias network formed by the resistors 23 and 24 serve to apply a positive bias to the emitter-base circuit of transistor 11 which causes conduction through the transistor resulting in a flow of current through the low impedance winding 38. Current flow through winding 38 induces a voltage in the high impedance winding 39 which causes the transistor to go "full on" and to drive the saturable core of reactor 37 from the point $a$ to the point $b$ on the hysteresis curve shown in FIGURE 6. Upon reaching positive saturation at point $b$, the transistor 11 is cut off and the flux is allowed to drop in the core forcing the flux from point $c$ to point $d$. This change in flux due to the bias ampere turns of winding 40 is opposed by the change in flux from the ampere turns of winding 40, part of which is tapped off by the center tap point 41, and supplied to the first saturable core reactor 42, and to the second saturable core reactor 47. The point at which the second saturable core reactor 47 saturates is determined by the value of the control signal from the source 52, and this in turn determines the point in the cycle of operation of the saturable core transformer-transistor control amplifier circuit at which the saturable core reactor 42 saturates. The point or phase at which the first saturable reactor 42 saturates, in turn, determines the value of the voltage $e_{sc2}$ which is applied in opposition to the bias voltage developed by the resistors 23 and 24, and hence controls the time required for the flux in the saturable core to be driven from point $c$ to point $d$ on the hysteresis curve of FIGURE 6. Upon reaching point $d$ on the hysteresis curve, the transistor is again switched on by the bias supplied from the bias resistors 23 and 24, and the cycle of oscillation is repeated at a frequency determined by the magnitude of the control signals supplied from the source 52. While the characteristics of the circuits shown in FIGURE 11 might vary depending upon the desired power to be controlled, it is possible to control upwards of 300 watts of power in a circuit shown in FIGURE 11 with a weak control signal having a value ranging from $-10$ to $+5$ microamperes.

Figure 12:
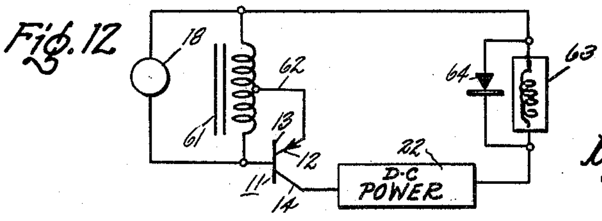
FIGURE 12 is a circuit diagram of another embodiment of the invention.

Still another embodiment of the invention is shown in FIGURE 12 of the drawings and comprises a saturable core transformer-transistor power control amplifier utilizing an auto-transformer as the controlling element. In the FIGURE 12 embodiment of the power control amplifier circuit, a saturable core auto-transformer indicated at 61 is provided which has its two terminals connected across a source of direct current control signals 18 and a center tap 62 connected to the emitter electrode 12 of transistor 11. One of the terminals of the saturable core transformer 61 is also connected to the base electrode 13 of the transistor, and the remaining terminal is connected through a load circuit 63 and direct current power supply 22 to the collector electrode 14 of the transistor. The load circuit 63 is indicated to be inductive in nature and for this reason has a by-pass rectifier 64 connected across it whose polarity is such that no current flows during conduction through the transistor 11, but the rectifier does conduct in the event of any inverse currents produced by the inductive load 63. For the purpose of illustration, the auto-transformer 61 may be wound on a circular core formed from a composition of 4% molybdenum, 79% nickel and 17% iron, and may have an inside diameter of about one half inch and outside diameter of .56 inch. The winding on the core may be composed of approximately 50 turns of .032 inch diameter copper wire with the center tap connection 62 being taken off at a point approximately 10 winding turns down from the high potential side. The load circuit 63 may comprise the field winding of a small motor or other inductive load wherein it would be necessary in order to protect the transistor 11 to include the smoothing rectifier 64. The FIGURE 12 circuit operates in identical fashion to the circuits shown in FIGURES 1 and 5 of the drawings with the exception that the saturable core transformer functions as an auto-transformer rather than as a two separate winding transformer in the manner of the circuits previously described. During the positive cycles of operation of the circuit (i.e., during the conduction of transistor 11) power is supplied to the load circuit 63. During this interval, because of its inductive nature, the load may build up a substantial electromagnetic field. Upon termination of conduction of the transistor 11, this electromagnetic field collapses, resulting in the production of an inverse current, which, if applied to the transistor 11, might result in damage, and accordingly is shunted by the by-pass rectifier 64. While the embodiment of the invention shown in FIGURE 12 poses no particular operational advantages over previously described examples, it is simple to construct, and requires one less winding on the saturable core transformer.

Figure 13:
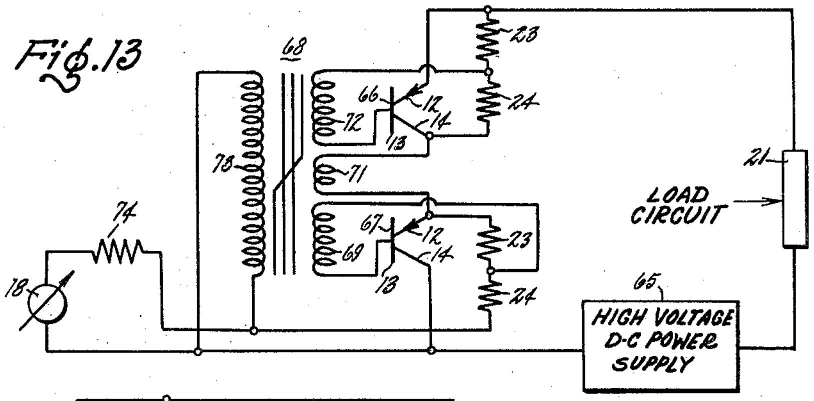
FIGURE 13 is a circuit diagram of a further embodiment of the invention.

A still further embodiment of the invention is shown in FIGURE 13 of the drawings. The FIGURE 13 circuit is designed for use in connection with a power supply source indicated at 65 having a voltage rating higher than the rating of a single one of the transistors which comprise a part of the power control amplifier herein disclosed. In this circuit, two power transistors 66 and 67, each having an emitter electrode 12, a base electrode 13, and collector electrode 14, are connected in series circuit relationship across a load circuit 21 and the high voltage direct current power supply 65. In this arrangement, a saturable core transformer 68 is provided which includes a first high impedance secondary winding 69, a low impedance primary winding 71, a second high impedance secondary winding 72 and a high impedance bias winding 73 all wound on a common core member. The emitter electrode 12 of transistor 67 is connected through the low impedance primary winding 71 to the collector electrode 14 of transistor 67. Both transistors 66 and 67 have a biasing network comprising a pair of series connected resistors 23 and 24 connected between the emitter and collector electrodes thereof with the biasing network 23 and 24 of transistor 67 also including the high impedance biasing winding 73 of saturable core transformer 68. The first high impedance winding 69 of the saturable core transformer has one of its terminals connected to the base electrode 13 of transistor 67, and the remaining terminal connected to the junction point of the biasing resistors 23 and 24 associated with transistor 67. The second high impedance winding 72 of saturable core transformer 68 has one of its terminals connected to the base electrode 13 of transistor 66, and the remaining terminal connected to the junction point of the biasing resistors 23 and 24 associated with transistor 66. The high impedance bias winding 73 is connected through a smoothing resistor 74 to a source of direct current biasing control signals 18 which may be similar in nature to the direct current control signals 18 used in the circuits illustrated in FIGURES 1 and 5 of the drawings.

In constructing the circuit illustrated in FIGURE 13 of the drawings, the high voltage power supply may comprise any standard 125 volt D.-C. supply. There are few, if any, transistors or other semi-conducting device in existence which could be effectively used with a power supply having a voltage rating of this capacity. For this purpose the circuit of FIGURE 13 utilizes two series connected transistors both of which are rated under the high voltage supply 65, and may comprise 2N173 or 2N174 power transistors as identified in connection with the description of the FIGURE 1 circuit. The biasing resistors 23 and 24 used with each transistor preferably have values of 2 ohms and 1000 ohms, respectively, and the smoothing resistor 74 has a value of 50 ohms. The saturable core of transformer 68 may be formed of a composition such as that identified with the previous embodiments of the invention with both the first and second high impedance windings 69 and 72 being formed from 50 turns of .032 inch diameter copper wire, the low impedance winding 71 being formed from 10 turns of .032 inch diameter copper wire, and the bias winding 72 being formed from .01 inch diameter copper wire.

In operation, the FIGURE 13 circuit functions in a manner identical to the circuits illustrated in FIGURES 1 and 5 of the drawings with the exception that the two transistors 66 and 67 must be operated together through a cycle of oscillation in the manner described with relation to the previously mentioned circuits. In operation, the individual characteristics of each of the transistors do not prevent the transistors from effectively switching in synchronism, for the switching currents involved are of a magnitude such that the individual characteristic of the transistors do not affect the time that the transistors are turned on and off by the saturable core transformer during oscillation of the circuit. Because the series connected transistors 66 and 67 serve as a voltage divider across the high voltage direct current power supply source 65 during operation, the high voltage is in effect divided betwen the two transistors. It should be noted that the divided voltage should not exceed the voltage rating of the individual transistors 66 and 67.

From the foregoing description it can be appreciated that the new and improved control amplifier provided by the present invention makes available a light weight and compace control amplifier for power purposes which is economical to construct. When operated at frequencies between 1 and 10 kilocycles, the control amplifier possesses a relatively rapid response time, and is entirely reliable in operation. It has been estimated that the power dissipated in the saturable core reactors saturable core transformer and the transistor of the control amplifier circuit is approximately 1 percent of the load power capacity of the amplifier, thereby providing a highly efficient amplifier. Further because of the possibility of tapping off alternating current power to supply additional preamplification stages that require alternating current power for operation, it is possible to construct an extremely sensitive amplifier having a single power supply source, which is quite compact and efficient in operation.

Obviously, other modifications and variations of the present invention are possible in the light of the above teachings. It is therefore to be understood that changes may be made in the particular embodiment of the invention described which are within the full intended scope of the invention as defined by the appended claims.

What I claim as new and desire to secure by Letters Patent of the United States is:

1. A proportional control amplifier for power and converter purposes comprising a switching semiconductor having an input circuit and an output circuit, a saturable core transformer having a first winding and a second winding inductively and regeneratively coupled to the first winding, the first winding being connected in the input circuit of the swiching semiconductor and the second winding being connected in the output circuit of the switching semiconductor, a power source and load connected in the output circuit of the switching semiconductor and a single continuous linearly variable control and resetting signal input circuit means connected to the input circuit of the switching semiconductor through the first winding of the saturable core transformer for controlling the rate of resetting of the saturable core transformer in accordance with the control and resetting signal.

2. A proportional control amplifier for power and converter purposes including in combination a transistor having at least an emitter, base and collector electrodes, a saturable core transformer having a first high impedance winding and a second low impedance winding which are inductively and regeneratively coupled, said second low impedance winding being connected in the emitter-collector circuit of said transistor and said first high impedance winding being connected in the emitter-base circuit of said transistor, a power source and load connected in the emitter-collector circuit of said transistor, and a single continuous linearly variable control and resetting signal input circuit means effectively coupled to the emitter-base circuit of said transistor through the first high empedance winding of said saturable core transformer for controlling the rate of resetting of the saturable core transformer in accordance with the control and resetting signal.

3. A proportional control amplifier for power and converter purposes including in combination, a transistor having at least an emitter, base and collector electrodes, a pair of bias resistors connected in series circuit relationship between the emitter and collector electrodes of said transistor, a saturable core transformer having a low impedance winding and a high impedance winding which are inductively coupled, said low impedance winding being connected in the emitter-collector circuit of said transistor and said high impedance winding being connected to the junction of said bias resistors in the emitter-base circuit of said transistor, a power source and load connected in the emitter-collector circuit of said transistor, and a control signal source connected to the emitter-base circuit of said transistor through the high impedance winding of said saturable core transformer.

4. A proportional control amplifier for power and converter purposes including in combination a transistor having at least an emitter, base and collector electrodes, a saturable core transformer having a low impedance winding, a high impedance winding and a bias winding which are inductively coupled, said low impedance winding being connected in the emitter-collector circuit of said transistor and being regeneratively coupled to set high impedance winding, and said high impedance winding being connected in the emitter-base circuit of said transistor, a power source and load connected in the emitter-collector circuit of said transistor, a biasing and resetting signal input circuit means connected to said bias winding for controlling the rate of resetting of said saturable core transformer, and a rectifier and variable impedance connected in series circuit relationship across said high impedance winding.

5. A proportional control amplifier for power and converter purposes including in combination a transistor having at least an emitter, base and collector electrodes, a first saturable core transformer having a low impedance winding, a high impedance winding and a bias winding which are inductively coupled, said low impedance winding being connected in the emitter-collector circuit of said transistor and said high impedance winding being connected in the emitter-base circuit of said transistor, a power source and load connected in the emitter-collector circuit of said transistor, a source of biasing signals connected to said bias winding, a second saturable core reactor having a high impedance winding connected in series circuit relationship with a rectifier and with the high impedance winding of said first saturable transformer and having a low impedance winding connected to a source of control signals.

6. The circuit set forth in claim 5 further characterized by a pair of bias resistors connected in series circuit relationship between the emitter and collector electrodes of the transistor.

7. A proportional control amplifier for power and converter purposes including in combination a transistor having at least an emitter, base and collector electrodes, a first saturable core transformer having a low impedance winding, a high impedance winding and a bias winding which are inductively coupled, said low impedance winding being connected in the emitter-collector circuit of said transistor said high impedance winding being connected in the emitter-base circuit of said transistor, and said bias winding being connected in the collector-base circuit of said transistor, a power source and load connected in the emitter-collector input circuit means of said transistor, a saturable core reactor having a high impedance winding connected by a tap connection to said bias winding and having a rectifier connected in series circuit relationship therewith, and a second saturable core reactor having a high impedance winding connected through a rectifier to a tap connection on said first reactor, said second reactor also having a low impedance winding that is inductively coupled to said high impedance winding and that is connected to a control signal source.

8. The circuit set forth in claim 7, further characterized by a pair of bias resistors connected in series circuit relationship between the collector and emitter electrodes of the transistor, through the bias winding of the saturable core transformer with one terminal of the high impedance winding of the first transformer being connected to the juncture of said series connected bias resistors, and the remaining terminal thereof being connected to the base electrode of the transistor.

9. A proportional control amplifier for power and converter purposes including in combination a transistor having at least an emitter, base and collector electrodes, a saturable core autotransformer having a low impedance winding and a high impedance winding which are inductively and regeneratively coupled, and a center tap connection, said low impedance winding being connected in the emitter-collector circuit of said transistor through said center tap connection, and said high impedance winding being connected in the emitter-base circuit of said transistor through said center tap connection, a power source and load connected in the emitter-collector circuit of said transistor, and a control and resetting signal input circuit means effectively coupled to the emitter-base circuit of said transistor through the high impedance winding of said saturable core transformer for controlling the rate of resetting of the saturable core transformer.

10. A proportional control amplifier for power and converter purposes including in combination, a pair of transistors each having at least an emitter, base and collector electrodes, a pair of bias resistors connected in series circuit relationship between the emitter and collector electrodes of each of said transistors, a saturable core transformer having a low impedance winding, first and second high impedance windings and a bias winding which are inductively coupled, said low impedance winding being connected to the emitter electrode of one of said transistors and to the collector electrode of the remaining transistor to thereby connect said transistors in series circuit relationship, and said first and second high impedance windings, each having one of its terminals connected to the junction of its associated bias resistors in the emitter-base circuit of each transistor and each being regeneratively coupled to said low impedance winding, and the remaining terminals thereof connected to the base electrode of its associated transistor, a high voltage power source and load connected across the series connected transistors in series circuit relationship, and a control and resetting signal input circuit means connected across the bias winding of said saturable core transformer for controlling the rate of resetting of said saturable core transformer.

References Cited in the file of this patent

UNITED STATES PATENTS

| | | |
|---|---|---|
| 2,621,073 | Lowman | Oct. 5, 1954 |
| 2,772,357 | An Wang | Nov. 27, 1956 |
| 2,772,370 | Bruce | Nov. 27, 1956 |
| 2,801,345 | Eckert et al. | July 30, 1957 |
| 2,805,020 | Lanning | Sept. 3, 1957 |
| 2,848,614 | Lyons | Aug. 19, 1958 |
| 2,882,482 | Simkins | Apr. 14, 1959 |
| 2,903,601 | Schneider | Sept. 6, 1959 |
| 2,910,594 | Bauer et al. | Oct. 27, 1959 |
| 2,952,841 | Lund | Sept. 13, 1960 |

OTHER REFERENCES

Article: Transistor-Magnetic Core Circuit, by Guterman et al., pages 84–94, I.R.E. Convention Record, March 1955.